United States Patent
Melhus

(10) Patent No.: US 12,157,688 B2
(45) Date of Patent: Dec. 3, 2024

(54) FILTRATION APPARATUS UTILIZING DIFFERENTIAL PRESSURE OVER A FILTERING ELEMENT

(71) Applicant: PRO-FLO AS, Stavanger (NO)

(72) Inventor: Trond Melhus, Sandnes (NO)

(73) Assignee: PRO-FLO AS, Stavanger (NO)

( * ) Notice: Subject to any disclaimer, the term of this patent is extended or adjusted under 35 U.S.C. 154(b) by 395 days.

(21) Appl. No.: 17/430,630

(22) PCT Filed: Feb. 15, 2019

(86) PCT No.: PCT/EP2019/053789
§ 371 (c)(1),
(2) Date: Aug. 12, 2021

(87) PCT Pub. No.: WO2020/164730
PCT Pub. Date: Aug. 20, 2020

(65) Prior Publication Data
US 2022/0127178 A1    Apr. 28, 2022

(51) Int. Cl.
*C02F 11/123* (2019.01)
*B01D 33/04* (2006.01)
(Continued)

(52) U.S. Cl.
CPC ............ *C02F 11/123* (2013.01); *B01D 33/04* (2013.01); *B01D 33/46* (2013.01); *C02F 11/16* (2013.01); *C02F 2201/005* (2013.01)

(58) Field of Classification Search
USPC ........................................................ 210/136
See application file for complete search history.

(56) References Cited

U.S. PATENT DOCUMENTS 3,358,834 A    12/1967  Mahamad
3,876,547 A     4/1975  Kaess
(Continued)

FOREIGN PATENT DOCUMENTS

CN    104548716 A    4/2015
DE      4437175 A1    4/1996
(Continued)

OTHER PUBLICATIONS

EP0391091 Teckentrup—Vacuum belt filtration apparatus (Abstract & Machine Translation; Oct. 10, 1990; 30 pages) (Year: 1990).*

(Continued)

*Primary Examiner* — Hayden Brewster
(74) *Attorney, Agent, or Firm* — RMCK Law Group, PLC

(57) ABSTRACT

A filtration apparatus for filtrating particles from fluid, the filtration apparatus comprising a filtration vessel; at least one filtering element for removing particles from fluid passing therethrough, the at least one filtering element being arranged to move along a path into the filtration vessel, and out from the filtration vessel; a filtration inlet arranged to convey a mixture of particles and fluid to the at least one filtering element within the filtration vessel; and a filtration outlet arranged to convey fluid, filtrated by the at least one filtering element, out from the filtration vessel; wherein the filtration apparatus is configured to establish a differential pressure over the at least one filtering element inside the filtration vessel. A method of filtrating particles from fluid is also provided.

13 Claims, 4 Drawing Sheets

(51) Int. Cl.
  *B01D 33/46* (2006.01)
  *C02F 11/16* (2006.01)

(56) References Cited

U.S. PATENT DOCUMENTS

| | | |
|---|---|---|
| 4,250,036 A | 2/1981 | Parshall |
| 5,209,841 A | 5/1993 | Bratten |
| 7,404,895 B2 | 7/2008 | Reynders |

FOREIGN PATENT DOCUMENTS

| | | | |
|---|---|---|---|
| DE | 202006010759 U1 | | 11/2007 |
| EP | 0024041 A1 | | 2/1981 |
| EP | 0391091 A1 | | 10/1990 |
| EP | 0668094 A2 | | 8/1995 |
| JP | H05212217 A | | 8/1993 |
| JP | 2003275514 A | | 9/2003 |
| KR | 19990080521 A | | 11/1999 |

OTHER PUBLICATIONS

PCT International Preliminary Report on Patentability mailed May 7, 2021 for International Application No. PCT/ EP2019/053789, 34 pages.

PCT International Search Report and Written Opinion mailed Oct. 17, 2019 for International Application No. PCT/ EP2019/053789, 14 pages.

English Translation of Chinese Office Action and Search Report dated Oct. 9, 2022 for Chinese Application No. 201980092006.7, 7 pages.

Egyptian Examination Report and English Translation dated Jul. 5, 2023 from the Egyptian Patent Office for Egyptian Patent Application No. 2021081230, 14 pages.

India Examination Report dated Sep. 1, 2023 for Indian Patent Application No. 202147041695, 8 pages.

English translation of Korean Office Action dated Aug. 26, 2024 for Korean Application No. 10-2021-7029344, 4 pages.

\* cited by examiner

US 12,157,688 B2

FILTRATION APPARATUS UTILIZING DIFFERENTIAL PRESSURE OVER A FILTERING ELEMENT

CROSS-REFERENCE TO RELATED APPLICATIONS

This application is a 371 U.S. National Stage of International Application No. PCT/EP2019/053789, filed Feb. 15, 2019. The disclosure of the above application is incorporated herein by reference in its entirety.

TECHNICAL FIELD

The present disclosure generally relates to filtration. In particular, a filtration apparatus for filtrating particles from fluid, and a method of filtrating particles from fluid, are provided.

BACKGROUND

Various types of filtration of fluids are carried out today, for example by filtrating wastewater in order to protect the environment, or by filtrating industrial fluids to improve industrial processes. Known wastewater filtration installations are often bulky and very energy intensive, and high amounts of chemicals may be used, e.g. for flocculation. The filtride or sludge generated by these filtration process also has a high water content, often more than 90%. The sludge of high water content is typically transported to remote facilities for drying the sludge. Both the transportation and the drying may involve the use of large amounts of fossil fuels, resulting in a high environmental impact.

Discharge of particles into the environment is also an increasing concern. Particles discharged into lakes may contribute to overfertilization and may shade plants at the bottom of the lake from sunlight. More and more plastic particles are also discharged into the environment. Many types of plastic particles have the same density as water and do therefore not fall to the bottom, making these particles more difficult to collect.

U.S. Pat. No. 3,358,834 A discloses an apparatus for filtering liquids. The apparatus comprises a sump tank, a filter medium, an endless conveyor for supporting the filter medium mounted to move around the sump tank, a liquid distributor and a discharge pipe. The space underlying the filter medium is evacuated to produce a partial vacuum or lower absolute pressure than atmospheric to promote and control the flow of liquid and air through the filter medium.

EP 0668094 A2 discloses a filter assembly comprising a collection vessel, an endless filter belt, a suction chamber, and a suction pump. The suction pump is used to generate a vacuum in the suction chamber, which causes the suspension to be filtered.

SUMMARY

One object of the present disclosure is to provide a filtration apparatus having an efficient filtration.

A further object of the present disclosure is to provide a filtration apparatus that is energy efficient.

A still further object of the present disclosure is to provide a filtration apparatus having a high filtration capacity.

A still further object of the present disclosure is to provide a filtration apparatus that is environmentally friendly, e.g. requiring less use of environmentally harmful chemicals.

A still further object of the present disclosure is to provide a filtration apparatus enabling long continuous filtration operations without interruption.

A still further object of the present disclosure is to provide a filtration apparatus having a compact design.

A still further object of the present disclosure is to provide a filtration apparatus enabling simple installation, such as a flexible installation and/or a enablement of a retro-fit.

A still further object of the present disclosure is to provide a filtration apparatus solving several or all of the foregoing objects in combination.

A still further object of the present disclosure is to provide a method of filtrating particles from fluid, which method solves one, several or all of the foregoing objects.

According to one aspect, there is provided a filtration apparatus for filtrating particles from fluid, the filtration apparatus comprising a filtration vessel; at least one filtering element for removing particles from fluid passing therethrough, the at least one filtering element being arranged to move along a path into the filtration vessel and out from the filtration vessel; a filtration inlet arranged to convey a mixture of particles and fluid to the at least one filtering element within the filtration vessel; and a filtration outlet arranged to convey fluid, filtrated by the at least one filtering element, out from the filtration vessel; wherein the filtration apparatus is configured to establish a differential pressure over the at least one filtering element inside the filtration vessel.

A liquid column can be accommodated inside the filtration vessel on the filtering element. The weight of this liquid column generates an overpressure on the filtering element, i.e. upstream of the filtering element. The differential pressure may be constituted by a pressure difference between a pressure upstream of (e.g. geodetically above) the at least one filtering element inside the filtration vessel, and a pressure downstream of (e.g. geodetically below) the filtering element. The differential pressure causes fluid to be sucked through the filtering element within the filtration vessel.

By moving the filtering element out from the filtration vessel, various treatments of the filtering element can be carried out outside a filtration zone without interrupting a filtration operation of the filtration apparatus. For example, one section of an endless filtering element (or one cassette comprising a filtering element) may be cleaned outside the filtration vessel while another section of the endless filtering element (or another cassette comprising a filtering element) is positioned inside the filtration vessel for filtration of particles.

Throughout the present disclosure, the fluid from which particles are filtrated by means of the filtration apparatus may be liquids, gases and combinations thereof. In particular, the filtration apparatus according to the present disclosure may be configured to filtrate particles, and optionally also substances, from water.

The filtration apparatus may be used to filtrate inlet water to and/or outlet water from a fish farming tank, for example from plastic particles and other particles such as salmon louse. In fish farming, the need for filtrating inlet water and outlet water is typically large. Typical water flows are in the range of 6 m³/s to 15 m³/s.

As a further example, the filtration apparatus according to the present disclosure may be used to purify municipal water, and/or to filtrate particles, such as excrements and food, from wastewater before returning to the environment. The filtration apparatus may be integrated in a wastewater system. In this case, the differential pressure for the filtration apparatus can be established by design, i.e. the filtration apparatus can be integrated such that an optimal differential pressure is established during normal operation of the wastewater system.

The filtration apparatus according to the present disclosure may be used to filtrate plastic particles, such as microplastics which have particle sizes of less than 0.5 mm. The filtration apparatus according to the present disclosure may also be used to filtrate various substances, such as fat or excrements, from fluid.

As a further example, the filtration apparatus according to the present disclosure may be used to filtrate various industrial fluids, e.g. to filtrate various liquids for pipe cleaning or fluids in hydraulic systems.

As a further example, the filtration apparatus according to the present disclosure may be used to separate oil from water. This is useful in connection with oil spills. For example, the filtration apparatus may be used to filtrate oil from seawater in a mixture collected from within a containment boom. Large volumes of the mixture may be pumped to a filtration apparatus onboard a vessel for high capacity filtration. The filtrate, i.e. cleaned water, may be discharged back to the sea. This type of filtration will be particularly effective in cold water where the oil viscosity becomes very high relative to the water. Since containment booms are sensitive to waves, the filtration apparatus according to the present disclosure can provide an excellent complement to containment booms.

The filtration apparatus according to the present disclosure may for example be configured to handle a flow of 5 $m^3/s$ to 15 $m^3/s$, such as 10 $m^3/s$. When the fluid flow conveyed by the filtration inlet is 8 $m^3/s$, the differential pressure through the filtering element inside the filtration vessel may be between 100 Pa (1 mbar) and 260 kPa (2600 mbar). When the fluid volume flow per area is 5 $l/cm^2/min$, the differential pressure may be at least 5 kPa (50 mbar), such as 10 kPa (100 mbar) to 600 kPa (6000 mbar).

In addition to establishing the differential pressure, the filtration apparatus may be configured to control the differential pressure over the at least one filtering element inside the filtration vessel. In this way, also the flow of fluid through the filtering element can be controlled. The control of the differential pressure may be stepless. The control of the differential pressure can be made by controlling an overpressure upstream of the at least one filtering element inside the filtration vessel, and/or by controlling an underpressure downstream of the filtering element.

The at least one filtering element may be configured to separate particles above a certain size from the fluid. Throughout the present disclosure, the at least one filtering element may be constituted by a single filtering element, such as an endless filtering element, or by a plurality of filtering elements, e.g. sequentially arranged along the path.

The at least one filtering element may be arranged to circulate along the path. The circulation may for example be accomplished by means of a rotating drum or by means of a conveyor belt.

The path may comprise a low section, lowered into the filtration vessel. Thereby, the at least one filtering element can be conveyed through a fluid contained in the filtration vessel. The filtering element can thus be submerged in the fluid inside the filtration vessel.

Throughout the present disclosure, a mixture containing particles and fluid supplied to the filtering element may be referred to as a feed, a fluid filtrated by the filtering element may be referred to as a filtrate, and particles removed by the filtering element may be referred to as a filtride.

The filtering element positioned inside the filtration vessel provides a filtration zone. The filtration apparatus may comprise further filtration zones. For example, the filtration apparatus may further comprise a coarse filter for filtrating the fluid upstream of the at least one filtering element inside the filtration vessel. The coarse filter may for example be configured to remove coarse particles and/or various substances, such as fat. According to one example, the coarse filter has a mesh size of 3 mm or larger.

The filtration vessel may comprise a bottom and side walls erected from the bottom. The path may extend into an interior of the filtration vessel, pass between the bottom and the filtration inlet, and extend out from the interior of the filtration vessel. According to one example, the filtration vessel has a depth of at least 0.5 m, such as at least 1 m.

The filtration vessel and the at least one filtering element may be configured such that any fluid from the filtration inlet must pass through the filtering element inside the filtration vessel in order to reach the filtration outlet. That is, the only way for fluid from the filtration inlet to reach the filtration outlet is through the filtering element inside the filtration vessel. For example, a width of the filtering element perpendicular to the path and an interior width of the filtration vessel perpendicular to the path may be equal, or substantially equal.

The at least one filtering element may comprise an endless filtering element arranged to move along the path. To this end, the filtration apparatus may further comprise at least two rollers. The endless filtering element may be arranged around the at least two rollers. The endless filtering element may for example be supported by an endless conveyor belt driven around the rollers. The conveyor belt may have a very high permeability, e.g. substantially higher than the filtering element supported on the conveyor belt. As an alternative, a plurality of filtering elements may be attached to the belt. In any case, the belt may take all or a substantial load of the mixture of particles and fluid.

The use of an endless filtering element moving along a path both inside and outside the filtration vessel enables a flexible installation since the path outside the filtration vessel can easily be adapted to a specific installation site. For example, the position of a cleaning device relative to the filtration vessel can be changed.

The path may comprise two geodetically high sections and a geodetically low section between the two high sections, and the low section may be arranged inside the filtration vessel. The two high sections may or may not be constituted by the geodetically highest points of the path. The low section and the two high sections according to the present disclosure may be established by means of either a conveyor belt or a drum. In case the at least one filtering element, e.g. an endless filtering element, is supported by a rotating drum, the drum may have a very high permeability, e.g. substantially higher than the filtering element supported by the drum.

The at least one filtering element may be configured to remove particles of a size of less than 100 μm, such as less than 50 μm. For example, the at least one filtering element may comprise pore sizes of 5 μm to 40 μm. Microplastics have a particle size of less than 0.5 mm. Thus, most microplastics can be removed by the filtering element. Larger pore sizes require lower differential pressures and vice versa.

In addition to the pore size, the permeability of the filtering element and/or the viscosity of the fluid may be considered for determining an optimal differential pressure. A higher permeability of the filtering element may require lower differential pressures and vice versa. A higher viscosity of the fluid may require higher differential pressures and vice versa.

The at least one filtering element may comprise a wire cloth, such as a metal wire cloth or alloy wire cloth, having a three-dimensional pore geometry. Such filtering element provides a high permeability. The wire cloth may comprise warp wires and weft wires crossing each other and interwoven by a weave pattern. The warp wires may be formed in at least two different configurations to define warp wires of first and second types. A length of the first type of warp wires may deviate from a length of the second type of warp wires in relation to a particular length unit. Pores may be formed in interstices between sections of two neighbouring warp wires and crossing sections of two neighbouring weft wires.

One example of a wire cloth according to the present disclosure is Minimesh® RPD HIFLO-S sold by Haver & Boecker, such as RPD HIFLO 5 S, 10 S, 15 S, 20 S, 30 S or 40 S. Such wire cloths have exceptionally high permeabilities and higher filtride carrying capacity in comparison with other filters of the same pore size, and can perform filtration over a wide range of differential pressures. A further example of a wire cloth according to the present disclosure is also described in US patent application US 2011290369 A1. The at least one filtering element may be acid resistant, corrosion resistant, pressure resistant and/or temperature resistant.

The filtration apparatus may further comprise at least one cleaning device outside the filtration vessel, and the at least one filtering element may be arranged to move along the path past the cleaning device for cleaning of the at least one filtering element by the cleaning device. Cleaning of the at least one filtering element can thereby be made outside the filtration zone inside the filtration vessel, e.g. in a cleaning zone. Thus, the cleaning can be separated from the filtration process. The cleaning device may for example comprise an air knife, a scraper, a magnet, or a flusher for cleaning the at least one filtering element.

By separating the cleaning zone and the filtration zone, a filtration operation by the filtration apparatus can be carried out continuously over long time periods. During the continuous operation, the mixture of particles and fluid can be conveyed to a cleaned section of an endless filtering element inside the filtration vessel. The inlet mixture will thereby always "see", or be exposed to, a clean filtering element inside the filtration vessel.

The filtration apparatus may further comprise at least one drying device outside the filtration vessel, and the at least one filtering element may be arranged to move along the path past the drying device for drying particles removed from the at least one filtering element. Drying of filtrated particles can thereby be made outside the filtration zone inside the filtration vessel, e.g. in a drying zone. Thus, the drying can be separated from the filtration process. In addition to cleaning and drying, a further example of treatment of the filtering element that can be carried out outside the filtration zone is sterilization.

The filtration apparatus may further comprise a pressure device arranged to control the differential pressure over the filtering element within the filtration vessel. The pressure device may for example be arranged to generate an underpressure downstream of the filtering element. Furthermore, the pressure device may be arranged to provide a stepless control of the differential pressure.

The filtration apparatus may further comprise a collection volume for receiving filtrated fluid from the filtration outlet, and a collection volume outlet arranged to convey filtrated fluid out from the collection volume. A liquid column of filtrated liquid can thereby be accommodated inside the collection volume. The weight of this liquid column generates an underpressure on the filtering element, i.e. downstream of the filtering element.

The collection volume may be provided in a collection vessel. The collection vessel may be open to atmosphere. Furthermore, the filtration outlet may extend into the collection vessel, e.g. by means of a pipe. The filtration outlet may open into the collection vessel in a lower region of the collection vessel.

Alternatively, the collection volume may be provided in a closed collection pipe. In this case, the collection pipe may establish a fluid communication between the filtration outlet and the collection volume outlet.

The pressure device may comprise a valve arranged to control a flow through the collection volume outlet. By closing the valve, the differential pressure decreases. By opening the valve, the differential pressure increases.

The filtration apparatus may be configured to control operation of the valve based on a liquid level in the filtration vessel. To this end, the filtration apparatus may comprise a liquid level sensor configured to read a liquid level inside the filtration vessel. A control system of the filtration apparatus may be configured to control the operation of the valve based on liquid level data in the filtration vessel read by the liquid level sensor.

Alternatively, or in addition, the filtration apparatus may be configured to control operation of the valve based on a liquid level in the collection volume. To this end, the filtration apparatus may comprise a liquid level sensor configured to read a liquid level inside the collection volume. The control system of the filtration apparatus may be configured to control the operation of the valve based on liquid level data in the collection volume read by the liquid level sensor.

Alternatively, or in addition, the filtration apparatus may be configured to control operation of the valve based on a pressure in the collection volume. To this end, the filtration apparatus may comprise a pressure sensor configured to read a pressure inside the collection volume, for example a pressure of filtrated fluid or a pressure of gas compressed by filtrated liquid. The control system of the filtration apparatus may be configured to control the operation of the valve based on pressure data in the collection volume read by the pressure sensor.

According to an alternative variant, the pressure device comprises a floater arranged to float on a surface of fluid in the filtration vessel, and a plug arranged to open the collection volume outlet when the level of fluid in the filtration vessel is low, and to close the collection volume outlet when the level of fluid in the filtration vessel is high. The pressure device may further comprise a connecting mechanism connecting the floater and the plug. The connecting mechanism may comprise a linkage. Thus, the filtration apparatus according to the present disclosure may be configured to mechanically control a differential pressure over the at least one filtering element, e.g. entirely without electronics.

The filtration apparatus may have a modular construction. For example, a first modular unit may comprise the filtration vessel, the filtering element, the filtration inlet and the filtration outlet, and a second modular unit may comprise the collection volume, such as the collection vessel, the collection volume outlet and the valve. In this case, the first modular unit may be placed on top of the second modular unit. The first modular unit and the second modular unit can be transported separately to an installation site. Each of the first modular unit and the second modular unit may be housed inside a container. The first modular unit may be referred to as a filtration unit and the second modular unit may be referred to as a collection volume unit.

According to a further aspect, there is provided a method of filtrating particles from fluid, the method comprising driving at least one filtering element along a path into a filtration vessel, the at least one filtering element being configured to remove particles from fluid passing therethrough; conveying a mixture of particles and fluid to the at least one filtering element within the filtration vessel; establishing a differential pressure over the at least one filtering element inside the filtration vessel; and driving the at least one filtering element along the path out from the filtration vessel.

The method may further comprise execution of any step, or a command for execution of any step, described herein. The method may comprise controlling the differential pressure over the at least one filtering element inside the filtration vessel, for example based on a liquid level in the filtration vessel, based on a liquid level in the collection volume and/or based on a pressure in the collection volume.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
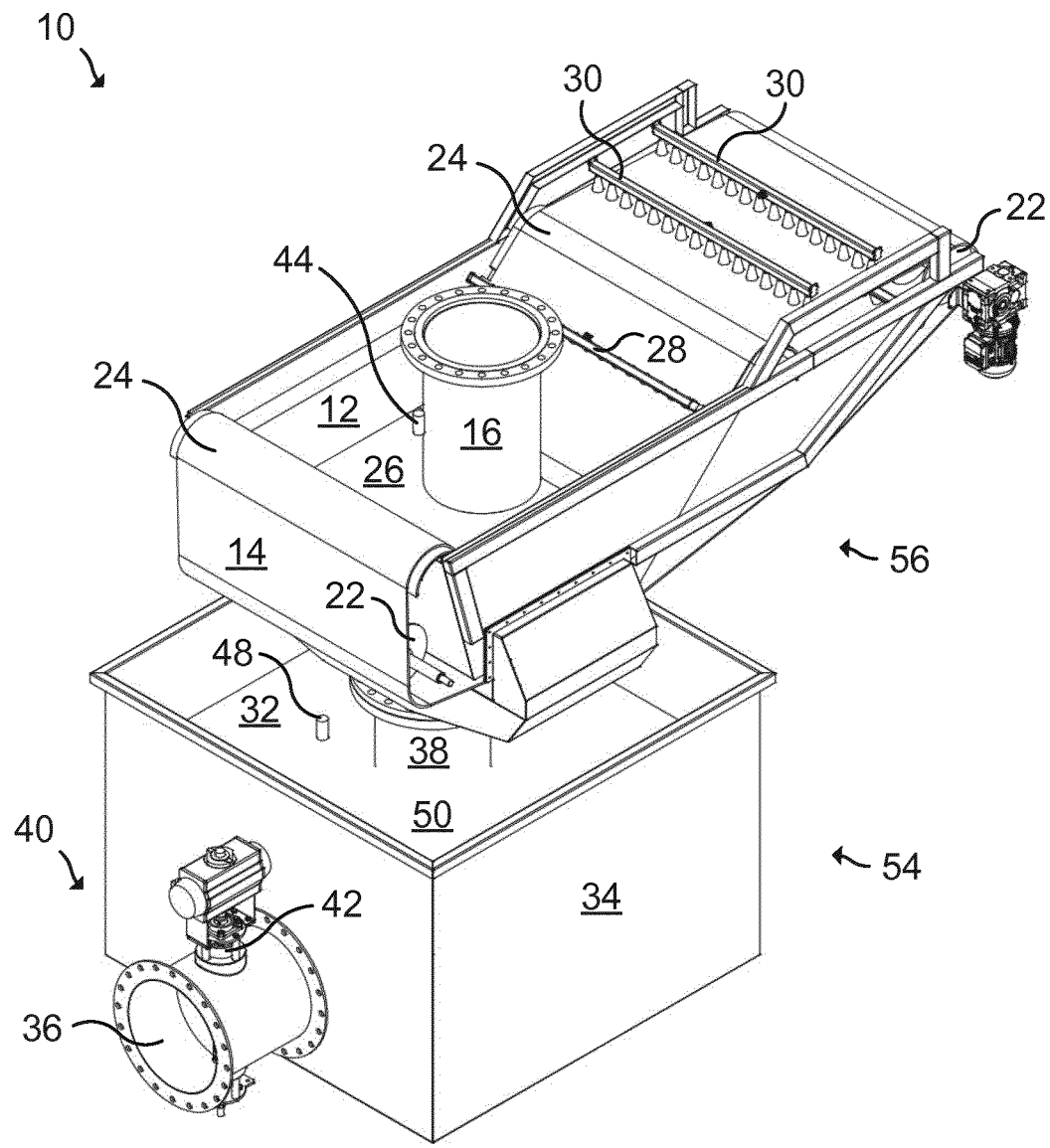
FIG. 1: schematically represents a perspective view of a filtration apparatus.

In the following, a filtration apparatus for filtrating particles from fluid, and a method of filtrating particles from fluid, will be described. The same reference numerals will be used to denote the same or similar structural features.

Figure 2:
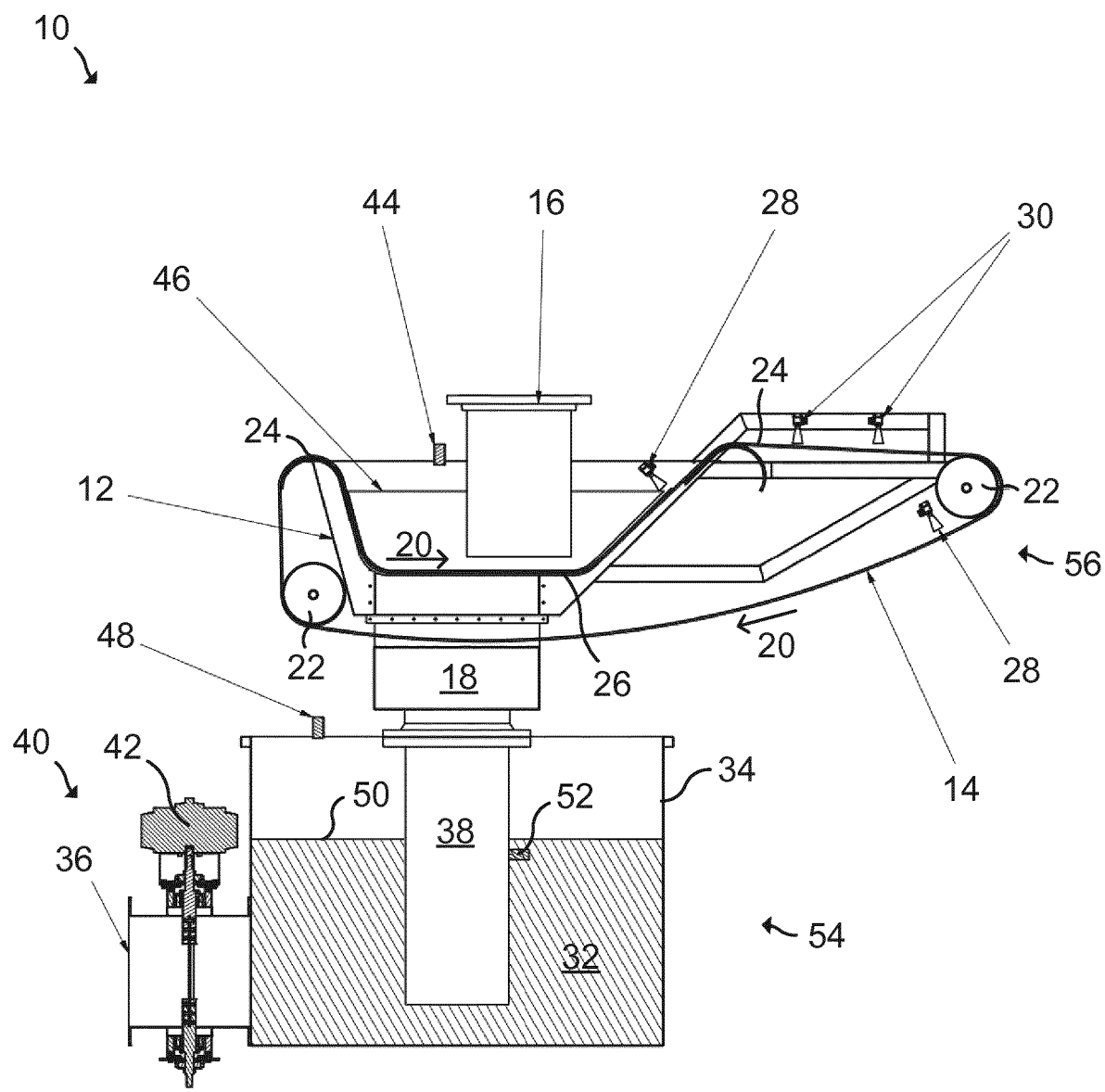
FIG. 2: schematically represents a cross-sectional side view of the filtration apparatus in FIG. 1.

FIG. 1 schematically represents a perspective view of one example of a filtration apparatus 10 and FIG. 2 schematically represents a cross-sectional side view of one example of the filtration apparatus 10. With collective reference to FIGS. 1 and 2, the filtration apparatus 10 is configured to filtrate particles from liquid, such as water. The filtration apparatus 10 may for example be used to filtrate particles from water into a fish cultivation basin, or to filtrate particles from wastewater. The filtration apparatus 10 may however also be used to filtrate particles from gases. The filtration apparatus 10 comprises a filtration vessel 12, a filtering element 14, a filtration inlet 16 and a filtration outlet 18.

The filtration vessel 12 of this example comprises a bottom, four walls and an open top. The depth of the filtration vessel 12 may be 1 m.

The filtering element 14 of this example is an endless filtering element 14. The filtering element 14 is supported on an endless conveyor belt. The filtering element 14 is arranged to be driven along a path 20. To this end, the filtration apparatus 10 comprises two rollers 22 and a plurality of guiding sections (not denoted) for guiding the conveyor belt and the filtering element 14 thereon. By driving one or both rollers 22, the filtering element 14 is driven to circulate along the path 20, generally clockwise in FIG. 2. The filtering element 14 may be driven continuously or intermittently along the path 20.

As shown in FIG. 2, the path 20 extends down into an interior of the filtration vessel 12, between the filtration inlet 16 and the bottom of the filtration vessel 12, and up and out from the interior of the filtration vessel 12. The path 20 comprises two geodetically high sections 24 and a geodetically low section 26 at the bottom of the filtration vessel 12 between the high sections 24. In this example, the geodetically high sections 24 are arranged adjacent to respective top ends of the filtration vessel 12. The filtering element 14 is thereby arranged to move into the filtration vessel 12 and out from the filtration vessel 12. A filtration zone is established by the filtering element 14 within the filtration vessel 12.

The filtering element 14 is configured to remove particles from fluid passing therethrough. The filtering element 14 of this example is a wire cloth having a three-dimensional pore geometry, such as Minimesh® RPD HIFLO-S sold by Haver & Boecker, which has an exceptional permeability. The filtering element 14 is configured to remove particles of a size less than 50 µm and can thereby remove most microparticles. The filtration apparatus 10 is however not limited to filtration of microparticles.

The filtration apparatus 10 of this example further comprises two cleaning devices 28, such as flushers. Each cleaning device 28 is configured to clean a section of the filtering element 14 passing by the cleaning device 28, e.g. by removing filtride of particles from the filtering element 14. In this regard, the filtration apparatus to may comprise a drain (not shown) for collecting removed filtride for further processing.

The first cleaning device 28 is arranged inside the filtration vessel 12 close to the top of the filtration vessel 12. The second cleaning device 28 is arranged downstream of the right roller 22 (in FIG. 2). As shown in FIG. 2, each cleaning device 28 is arranged outside the filtration zone. The path 20 further extends past the two cleaning devices 28.

The filtration apparatus to of this example further comprises two drying devices 30, such as air blowers. Each drying device 30 is configured to dry a section of the filtering element 14 passing by the drying device 30. In this example, the two drying devices 30 are arranged between the first cleaning device 28 and the right roller 22 (in FIG. 2). As shown in FIG. 2, also each drying device 30 is arranged outside the filtration zone. The path 20 further extends past the two drying devices 30.

The filtration inlet 16 is arranged to convey a mixture of particles and fluid to the filtration zone, i.e. onto the filtering element 14 inside the filtration vessel 12. In this example, the filtration inlet 16 is arranged geodetically above the filtration zone and extends into the filtration vessel 12. The filtration apparatus to may further comprise a coarse filter (not illustrated) upstream of the filtration inlet 16.

The filtration outlet 18 is arranged to convey filtrate, i.e. fluid filtrated by the filtering element 14, out from the filtration vessel 12. In the example in FIG. 2, the filtration outlet 18 is arranged at the bottom of the filtration vessel 12, i.e. geodetically below the filtering element 14 inside the filtration vessel 12.

The filtration apparatus to further comprises a collection volume 32, here exemplified as a collection vessel 34, and a collection volume outlet 36. Fluid filtrated by the filtering element 14 is received in the collection volume 32. The collection volume outlet 36 is arranged to convey filtrated fluid out from the collection volume 32. The collection vessel 34 of this example is open to atmosphere.

The filtration apparatus 10 of this example further comprises a pipe 38. One end of the pipe 38 is connected to the filtration outlet 18 and one end of the pipe 38 opens into the collection vessel 34 in a lower region of the collection vessel 34. The filtration outlet 18 is thereby extended into the collection vessel 34. The pipe 38 constitutes a levelling pipe.

The filtration apparatus 10 is configured to establish a differential pressure over the filtering element 14 inside the filtration vessel 12, i.e. over the filtration zone. To this end, the filtration apparatus 10 of this example further comprises a pressure device 40.

The pressure device 40 of this example is arranged to generate an underpressure downstream of the filtering element 14, e.g. inside the pipe 38. The pressure device 40 comprises a valve 42 arranged to selectively close and open the collection volume outlet 36. The valve 42 is thereby arranged to control a flow through the collection volume outlet 36. The valve 42 may further be arranged to control a degree of opening of the collection volume outlet 36. The pressure device 40 is thereby configured to steplessly control the differential pressure over the filtering element 14. By opening the valve 42, the differential pressure increases and vice versa.

The filtration apparatus 10 of this example further comprises a liquid level sensor 44. The liquid level sensor 44 is configured to read a liquid level 46 inside the filtration vessel 12.

The filtration apparatus 10 of this example further comprises a liquid level sensor 48. The liquid level sensor 48 is configured to read a liquid level 50 inside the collection volume 32, here comprising the collection vessel 34.

The filtration apparatus 10 of this example further comprises a pressure sensor 52. The pressure sensor 52 is configured to read a pressure inside the collection volume 32.

The filtration apparatus 10 further comprises a control unit (not shown). The control unit is configured to control operation of the valve 42 based on signals from the liquid level sensor 44, the liquid level sensor 48 and/or the pressure sensor 52. Thereby, the pressure device 40 is configured to control the differential pressure over the filtering element 14.

Furthermore, the filtration apparatus 10 in FIGS. 1 and 2 has a modular construction comprising a collection volume unit 54 and a filter unit 56 placed on top of the collection volume unit 54. The filter unit 56 of this example comprises the filtration vessel 12, the filtering element 14, the filtration inlet 16 and the filtration outlet 18. The collection volume unit 54 of this example comprises the collection vessel 34, the pipe 38, the collection volume outlet 36 and the valve 42. As shown in FIGS. 1 and 2, the filter unit 56 and the collection volume unit 54 provide a compact design of the filtration apparatus 10.

With reference to FIGS. 1 and 2, one example of a filtration operation of the filtration apparatus 10 will be described. A mixture of particles and liquid, optionally previously passed through a coarse filter, is conveyed by the filtration inlet 16 onto the filtering element 14 inside the filtration vessel 12. The mixture flow may for example be 10 m³/s.

The filtering element 14 is conveyed through the low section 26 at the bottom inside the filtration vessel 12. The particles are collected by the filtering element 14 at the bottom of the filtration vessel 12 and are conveyed out from the filtration vessel 12 by the movement of the filtering element 14 along the path 20. During the filtration operation, the filtering element 14 is continuously cleaned by the cleaning devices 28 and dried by the drying devices 30 such that a fresh piece of filtering element 14 is continuously fed into the filtration vessel 12. Thus, the filtration operation can be performed outside the filtration zone without interruption for cleaning of the filtering element 14 or interruptions for other types of maintenance operations.

Due to the resistance of the filtering element 14, a liquid column will be established on the filtering element 14 inside the filtration vessel 12. The weight of this liquid column generates a pressure upstream of the filtering element 14.

Filtrated liquid is conveyed away from the filtration vessel 12 by means of the filtration outlet 18. The filtrated liquid is conveyed by the pipe 38 into the collection volume 32.

By controlling the valve 42, the flow of filtrated fluid out from the collection volume 32 through the collection volume outlet 36 is controlled. Thereby, the liquid level 50 inside the collection vessel 34 can be controlled. The relationship between the liquid column in the filtration vessel 12 and the liquid column in the collection vessel 34 determines a differential pressure over the filtering element 14 inside the filtration vessel 12. By adjusting the liquid level in the collection vessel 34, the differential pressure is adjusted. The differential pressure causes the liquid in the filtration vessel 12 to be sucked through the filtering element 14 and into the collection volume 32. The differential pressure may be controlled in various ways, e.g. to maximize flow and/or to maximize particle separation from the liquid.

The filtration operation provides a filtride with low water content. This provides for a cheaper and more environmentally friendly transportation. The filtration apparatus 10 of the example in FIGS. 1 and 2 can produce a filtride having a water content of approximately 20%. The filtration apparatus 10 can make a large impact in terms of removing particles from wastewater. For example, the filtration apparatus 10 can significantly contribute to improved sea life.

Figure 3:
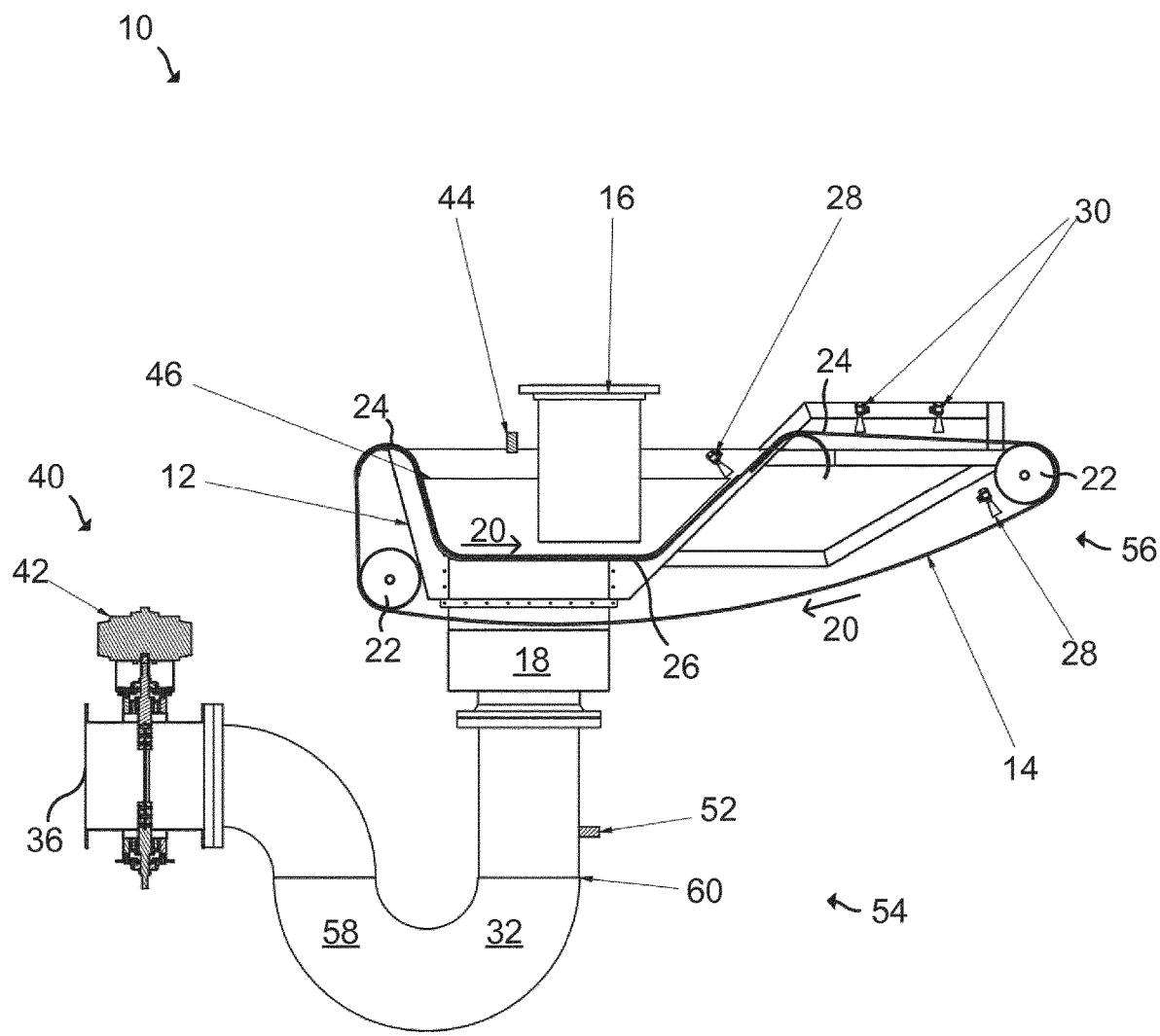
FIG. 3: schematically represents a cross-sectional side view of a further filtration apparatus.

FIG. 3 schematically represents a cross-sectional side view of a further filtration apparatus to. Mainly differences with respect to FIGS. 1 and 2 will be described.

Instead of the collection vessel 34 and the pipe 38 in FIGS. 1 and 2, the filtration apparatus to in FIG. 3 comprises a collection pipe 58 forming the collection volume 32. One end of the collection pipe 58 is connected to the filtration outlet 18 and one end of the collection pipe 58 is connected to the collection volume outlet 36. The collection pipe 58 is closed between the filtration outlet 18 and the collection volume outlet 36. A fluid lock 60 is provided in the collection pipe 58. The fluid lock 60 enables filtrated fluid to flow towards the collection volume outlet 36 but not back towards the filtration vessel 12.

Figure 4:
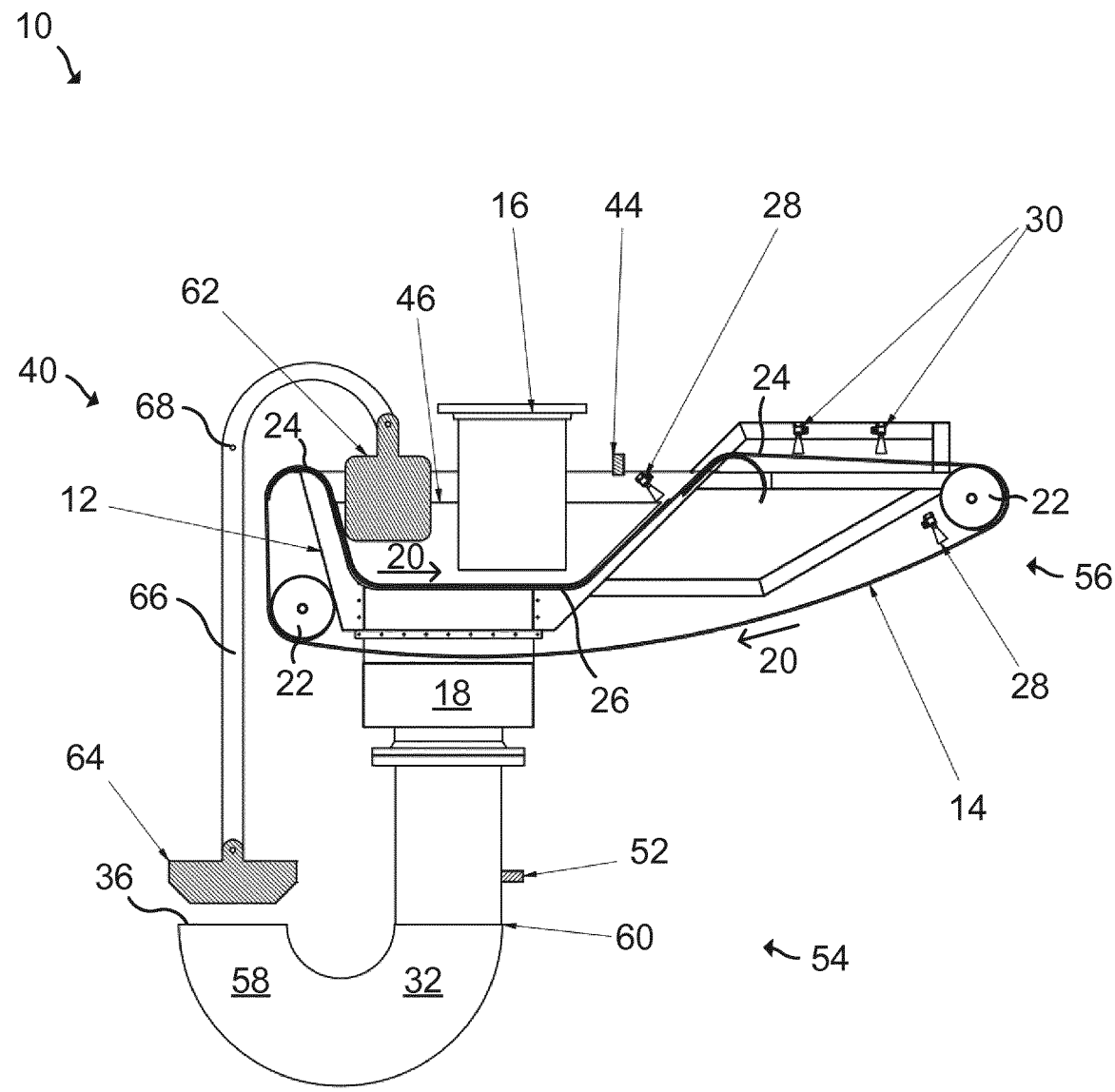
FIG. 4: schematically represents a cross-sectional side view of a further filtration apparatus.

FIG. 4 schematically represents a cross-sectional side view of a further filtration apparatus 10. Mainly differences with respect to FIGS. 1 to 3 will be described.

The filtration apparatus 10 in FIG. 4 comprises an alternative pressure device 40. The pressure device 40 in FIG. 4 comprises a floater 62, a plug 64 and a connecting mechanism 66. The connecting mechanism 66 is here exemplified as an arm pivotable about a stationary pivot 68. The floater 62 floats on the surface of the liquid in the filtration vessel 12. The plug 64 is arranged to open and close the collection volume outlet 36.

As shown in FIG. 4, when the liquid level 46 in the filtration vessel 12 is relatively low, the collection volume outlet 36 is open by means of the plug 64. When the liquid level 46 in the filtration vessel 12 rises, the floater 62 rises along with the liquid level 46. This causes the connecting mechanism 66 to rotate (counterclockwise in FIG. 4) about the pivot 68. This rotation of the connecting mechanism 66 causes the plug 64 to close the collection volume outlet 36.

Although the liquid level sensor 44 and the pressure sensor 52 are illustrated in FIG. 4, the pressure device 40 in FIG. 4 can operate entirely mechanically.

While the present disclosure has been described with reference to exemplary embodiments, it will be appreciated that the present invention is not limited to what has been described above. For example, it will be appreciated that the dimensions of the parts may be varied as needed.

The invention claimed is:

1. A filtration apparatus for filtrating particles from liquid, the filtration apparatus comprising:
 a filtration vessel;
 at least one filtering element for removing particles from liquid passing therethrough, the at least one filtering element being arranged to move along a path into the filtration vessel and out from the filtration vessel;
 a filtration inlet arranged to convey a mixture of particles and liquid to the at least one filtering element within the filtration vessel;
 a filtration outlet arranged to convey liquid, filtrated by the at least one filtering element, out from the filtration vessel;
 a collection volume for receiving filtrated liquid from the filtration outlet;
 a collection volume outlet arranged to convey filtrated liquid out from the collection volume;
 at least one sensor for sensing a condition within the filtration apparatus;
 a pressure device; and
 a control unit in communication with the at least one sensor and the pressure device,
 wherein the collection volume is configured such that a weight of a liquid column of filtrated liquid accommodated inside the collection volume generates an underpressure downstream of the at least one filtering element to establish a differential pressure over the at least one filtering element inside the filtration vessel, and
 wherein the control unit receives a sensor signal from the at least one sensor and controls the differential pressure over the filtering element within the filtration vessel via the pressure device.

2. The filtration apparatus according to claim 1, wherein the at least one filtering element comprises an endless filtering element arranged to move along the path.

3. The filtration apparatus according to claim 1, wherein the path comprises two geodetically high sections and a geodetically low section between the two high sections, and wherein the low section is arranged inside the filtration vessel.

4. The filtration apparatus according to claim 1, wherein the at least one filtering element is configured to remove particles of a size of less than 100 µm.

5. The filtration apparatus according to claim 1, wherein the at least one filtering element comprises a wire cloth having a three-dimensional pore geometry.

6. The filtration apparatus according to claim 1, further comprising at least one cleaning device outside the filtration vessel, and wherein the at least one filtering element is arranged to move along the path past the cleaning device for cleaning of the at least one filtering element by the cleaning device.

7. The filtration apparatus according to claim 1, further comprising at least one drying device outside the filtration vessel, and wherein the at least one filtering element is arranged to move along the path past the drying device for drying particles removed from the at least one filtering element.

8. The filtration apparatus according to claim 1, wherein the pressure device comprises a valve arranged to control a flow through the collection volume outlet.

9. The filtration apparatus according claim 8, wherein the at least one sensor comprises a liquid level sensor for sensing a liquid level in the filtration vessel, wherein the filtration apparatus is configured to control operation of the valve based on the liquid level in the filtration vessel.

10. The filtration apparatus according to claim 8, wherein the at least one sensor comprises a liquid level sensor for sensing a liquid level in the collection volume, wherein the filtration apparatus is configured to control operation of the valve based on the liquid level in the collection volume.

11. The filtration apparatus according to claim 8, wherein the at least one sensor comprises a pressure sensor for sensing a pressure in the collection volume, wherein the filtration apparatus is configured to control operation of the valve based on the pressure in the collection volume.

12. The filtration apparatus according to claim 1, wherein the filtration apparatus has a modular construction.

13. The filtration apparatus according to claim 1, wherein the at least one filtering element is configured to remove particles of a size of less than 50 µm.

* * * * *